(12) United States Patent
Hesse

(10) Patent No.: US 10,612,639 B2
(45) Date of Patent: Apr. 7, 2020

(54) GEAR PAIR OF A GEARBOX

(71) Applicant: ZF Friedrichshafen AG, Friedrichshafen (DE)

(72) Inventor: Torsten Hesse, Oberteuringen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 55 days.

(21) Appl. No.: 15/521,039

(22) PCT Filed: Sep. 21, 2015

(86) PCT No.: PCT/EP2015/071528
§ 371 (c)(1),
(2) Date: Apr. 21, 2017

(87) PCT Pub. No.: WO2016/062472
PCT Pub. Date: Apr. 28, 2016

(65) Prior Publication Data
US 2017/0314664 A1 Nov. 2, 2017

(30) Foreign Application Priority Data
Oct. 22, 2014 (DE) .......................... 10 2014 221 456

(51) Int. Cl.
*F16H 55/08* (2006.01)
*F16H 55/06* (2006.01)
(Continued)

(52) U.S. Cl.
CPC ........... *F16H 55/0806* (2013.01); *F16H 1/06* (2013.01); *F16H 1/14* (2013.01); *F16H 55/06* (2013.01);
(Continued)

(58) Field of Classification Search
CPC ...... F16H 1/04; F16H 55/08; F16H 2055/086; F16H 2055/0866; F16H 55/088; F16H 55/16
(Continued)

(56) References Cited

U.S. PATENT DOCUMENTS 2,737,854 A * 3/1956 Van Acker ................ B23F 5/20
409/12
3,180,227 A * 4/1965 Schlichthorlein ....... B23F 19/06
409/31
(Continued)

FOREIGN PATENT DOCUMENTS

DE  66 07 848 U   9/1971
DE  21 09 584 A1  9/1972
(Continued)

OTHER PUBLICATIONS

"A Procedure to Determine the Unknown Geometry of External Cylindrical Gears", from Gear Solutions, Rey et al., Feb. 2016 (Year: 2016).*
(Continued)

*Primary Examiner* — Bobby Rushing, Jr.
(74) *Attorney, Agent, or Firm* — Brinks Gilson & Lione

(57) ABSTRACT

Gear pairing of a transmission with a first gear and with a second gear engaged with the first gear, whereby the first gear, in comparison to the second gear, is manufactured from a material that is less elastic or less soft, and whereby the first gear and the second gear have different normal target base pitches.

19 Claims, 1 Drawing Sheet

(51) Int. Cl.
*F16H 55/16* (2006.01)
*F16H 1/06* (2006.01)
*F16H 1/14* (2006.01)

(52) U.S. Cl.
CPC ............. *F16H 55/08* (2013.01); *F16H 55/16* (2013.01); *F16H 2055/086* (2013.01)

(58) Field of Classification Search
USPC .......... 29/893, 893.3; 74/457, 460, 461, 462
See application file for complete search history.

(56) References Cited

U.S. PATENT DOCUMENTS

| | | | | |
|---|---|---|---|---|
| 3,555,922 | A * | 1/1971 | Preti | F16H 1/08 74/458 |
| 3,877,273 | A * | 4/1975 | Culver | B21H 5/02 29/893.32 |
| 3,881,364 | A * | 5/1975 | Rouverol | F16H 55/08 74/462 |
| 4,108,017 | A * | 8/1978 | Rouverol | F16H 55/08 74/462 |
| 4,259,875 | A * | 4/1981 | Rouverol | F16H 55/0806 74/462 |
| 4,565,474 | A * | 1/1986 | Charles | B23F 5/20 409/38 |
| 4,651,588 | A * | 3/1987 | Rouverol | F16H 55/0806 74/462 |
| 5,341,699 | A * | 8/1994 | Rouverol | F16H 55/08 74/462 |
| 5,357,325 | A * | 10/1994 | Kawaguchi | G03G 15/167 399/167 |
| 6,080,199 | A * | 6/2000 | Umeyama | F16H 55/0806 29/893.3 |
| 6,571,655 | B2 * | 6/2003 | Tanaka | F16H 55/0806 74/457 |
| 6,837,123 | B2 * | 1/2005 | Hawkins | F16H 55/08 74/457 |
| 8,944,793 | B2 * | 2/2015 | Ni | F16H 1/06 418/206.1 |
| 9,042,086 | B2 * | 5/2015 | Hu | H05K 7/02 361/679.01 |
| 2008/0196529 | A1 | 8/2008 | Sugitani | |
| 2010/0167867 | A1 | 7/2010 | Sugitani | |
| 2013/0292946 | A1 * | 11/2013 | Himmelmann | F03D 11/02 290/55 |
| 2014/0208894 | A1 * | 7/2014 | Miller | F16H 19/04 74/665 G |
| 2014/0345405 | A1 * | 11/2014 | Radzevich | F16H 55/08 74/412 R |
| 2015/0024898 | A1 * | 1/2015 | Radzevich | F16H 1/28 475/331 |
| 2015/0059523 | A1 * | 3/2015 | Lieder | F16H 55/0813 74/665 F |

FOREIGN PATENT DOCUMENTS

| | | | | |
|---|---|---|---|---|
| DE | 44 07 696 A1 | 9/1995 | | |
| DE | 197 48 964 A1 | 5/1999 | | |
| DE | 10 2006 059 184 A1 | 6/2008 | | |
| EP | 0 252 156 A1 | 1/1988 | | |
| EP | 1 914 443 A1 | 4/2008 | | |
| EP | 1 918 612 A1 | 5/2008 | | |
| WO | WO2015127250 | * | 8/2015 | ............. A61B 19/00 |

OTHER PUBLICATIONS

Geometry of Involute Gears, J.R. Colbourne, 1987 (Year: 1987).*
German Office Action in priority application DE 10 2014 221 456.4 dated Jul. 17, 2015, in German language, including English translation of p. 8 (10 pages).
International Search Report dated Feb. 12, 2016 in International Application No. PCT/EP2015/071528, 3 pages, German Language.
International Search Report dated Feb. 12, 2016 in International Application No. PCT/EP2015/071528, 2 pages, English Language.
Written Opinion of the International Search Authority dated Apr. 28, 2016 in International Application No. PCT/EP2015/071528, 5 pages, German Language.

* cited by examiner

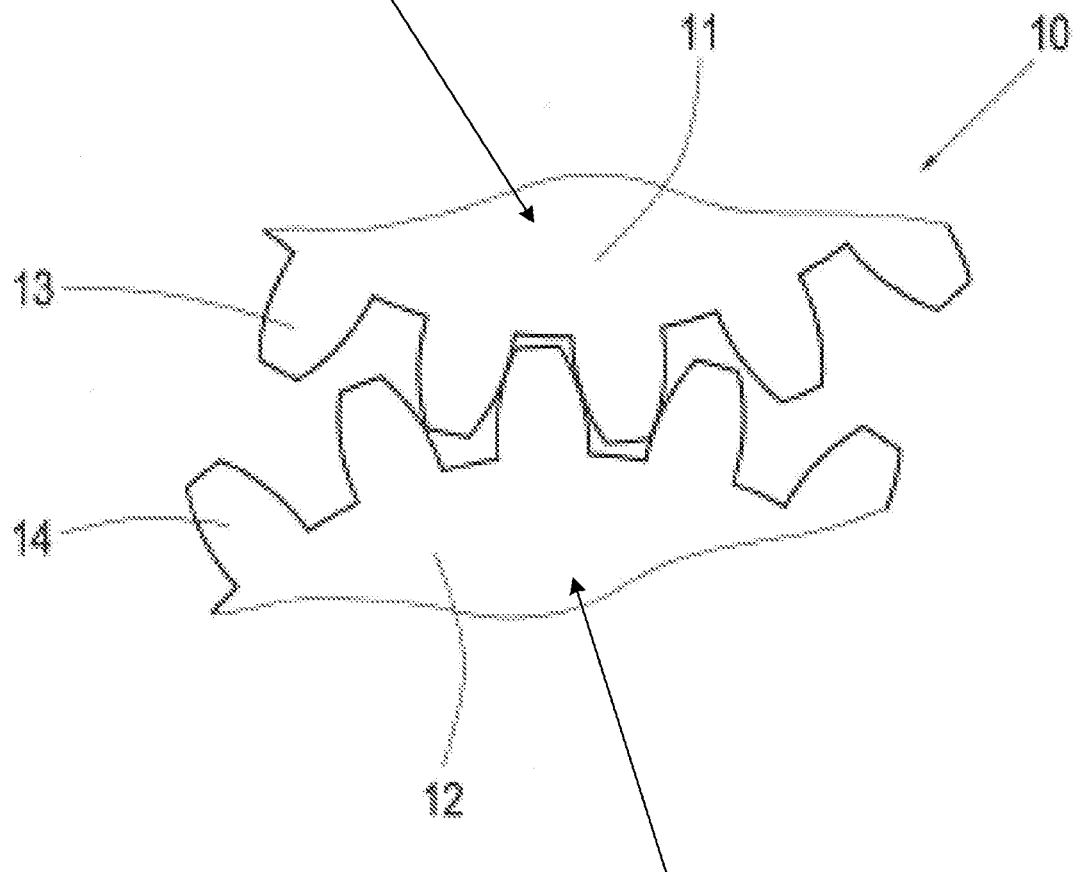

GEAR PAIR OF A GEARBOX

This application is a filing under 35 U.S.C. § 371 of International Patent Application PCT/EP2015/071528, filed Sep. 21, 2015, and claims the priority of DE 10 2014 221 456.4, filed Oct. 22, 2014. These applications are incorporated by reference herein in their entirety.

The disclosure relates to a gear pairing of a transmission.

Transmissions, such as cylindrical gears, bevel gears, or planetary gears have at least one gear pairing comprising a first gear and a second gear engaged with the first gear. The gear geometry of gears is defined by a multitude of different parameters, for instance through the so-called normal module and the so-called normal pressure angle, whereby the normal module and the normal pressure angle define the so-called normal base pitch. The above-listed geometrical parameters for the characterization of a gear geometry are familiar to the expert mentioned here and are known from DIN 21771, for example.

In gear pairings of a transmission known in practice, the first gear and the second gear have identical normal base pitches. An undisturbed operation or engaging of the gears of a gear pairing shall thus be ensured.

According to practice, deviations in the normal base pitches, namely deviations in the normal modules and the normal pressure angles of inter-engaging gears of a gear pairing are solely the result of production deviations or production tolerances. Normal target base pitches specified for the production are however identical.

Based on this, it is the task of the present disclosure to create a new type of gear pairing of a transmission.

This task is solved by means of a gear pairing of a transmission according to the claims. According to the disclosure, the first gear of the gear pairing is manufactured from a material that is less elastic or less soft in comparison to the second gear of the gear pairing; whereby the first gear of the gear pairing and the second gear of the gear pairing have different normal target base pitches.

With the present disclosure, with a gear pairing comprising a first, relatively inelastic gear and a second, relatively elastic gear it is proposed, for the first time, to provide for normal target base pitches deviating from each other for the gears. In this connection, it is important that the deviation in the normal target base pitches of the gears made of different materials is greater than the differences in the normal actual base pitches resulting from production deviations or production tolerances. According to the disclosure, the gears in the normal target base pitches specified for the production are therefore different. Through the disclosure, the wear on the gear made of the relatively elastic material can be reduced. The noise excitation on a gear comprising the gear pairing can furthermore be reduced.

According to an advantageous further design of the disclosure, the first gear made of the relatively inelastic material has a smaller normal target base pitch than the second gear made of the relatively elastic material, whereby the gear made of the relatively inelastic material has a bigger normal target pressure angle in comparison to the gear made of the relatively elastic material, and whereby the two gears furthermore preferably have the same normal target modules. Then, when the normal target pressure angle of the gear made of the relatively inelastic material is bigger in comparison to the normal target pressure angle of the gear made of the relatively elastic material, a compression increase from teeth of the gear made of the relatively elastic material can hereby be reduced in the foot area, whereby the wear on the gear made of the relatively elastic material can be reduced in an especially advantageous manner. In this connection, it is important that the deviation in the normal target pressure angles of the gears made of different materials is greater than the differences in the normal actual pressure angles resulting from production deviations or production tolerances. The gears therefore differ in the normal target pressure angles specified for production.

According to an advantageous further design of the disclosure, a deviation between the normal target base pitch of the first gear and the normal target base pitch of the second gear, particularly an angular deviation between the normal target pressure angle of the first gear and the normal target pressure angle of the second gear is dependent on operating stresses from the gear pairing and/or of the material pairing of the gear pairing. The determination of the deviation between the normal target base pitches, particularly the angular deviation between the normal target pressure angles, the operating stress depending on the gears of the gear pairing made of different elastic materials and/or operating temperatures and/or material pairings of the respective gear pairing is particularly advantageous.

According to another advantageous design of the disclosure, the first gear and the second gear have the same normal target modules. Then, when only the normal target pressure angles deviate from each other, but the gears have the same normal target modules, will an especially advantageous inter-engaging of the gears from the gear pairing be ensured with low wear.

According to another design of the disclosure, the first gear made of the relatively inelastic material is made of metal, and the second gear made of the relatively elastic material is made of a plastic. The disclosure is particularly well suited for a gear pairing, in which the first relatively inelastic gear is made of a metallic material and the second relatively elastic gear is made of a plastic.

The gear, which comprises at least one gear pairing per the disclosure, is preferably a cylindrical gear, a bevel gear, or a planetary gear.

Preferred further designs follow from the sub claims and the following description. Execution examples are explained in detail in a drawing without limitation. It thereby shows:

FIG. 1 a schematized section of a gear pairing of a cylindrical gear.

The present disclosure concerns a gear pairing of a transmission, such as an involute gear pairing of a cylindrical gear or a bevel gear or a planetary gear.

FIG. 1 shows a schematized section of a gear pairing of a cylindrical gear with a first gear 11 and a second gear 12 engaged with the first gear 11. The first gear 11 has teeth 13 and the second gear 12 has teeth 14 that are engaged with each other.

The gear geometry of such an involute gear pairing 10 is defined by a multitude of parameters which are generally known to the expert mentioned here and are known from DIN 21771, for example. The so-called normal module and the so-called normal pressure angle are listed in this section as parameters for the characterization of a gear geometry of gears that the normal target base pitch depends on.

The normal base pitch is thereby determined by means of the following equation:

$$p_{en} = \pi * m_n * \cos(\alpha_n)$$

whereby $p_{en}$ is the normal base pitch, whereby $m_n$ is the normal module, and whereby $\alpha_n$ is the normal pressure angle.

A normal target module and a normal target pressure angle are specified for the production of gears in each case.

As a result of production deviations or production tolerances, a normal actual module and a normal actual pressure angle form on the respective gear. Even if identical normal target modules and normal target pressure angles are therefore specified for the production of gears, normal actual modules and normal actual pressure angles deviating from each other can form as a result of the production tolerances or production deviations.

The present disclosure concerns a gear pairing 10 comprising a first gear 11 made of a relatively inelastic material, particularly a metallic material and a second gear 12 made of a relatively elastic material, particularly made of plastic.

According to the disclosure, it is suggested that the first gear 11 and the second gear 12 that are made of different elastic materials, have different normal target base pitches. The deviations of the normal target base pitches are not to be compared with deviations from the normal actual base pitches that can form due to production deviations or production tolerances. The gears of the gear pairing per the disclosure rather have different normal target base pitches. Normal target base pitches specifically deviating from each other are therefore defined for the gears of the gear pairing during production.

The first gear made of the relatively inelastic material preferably has a smaller normal target base pitch, particularly preferable a greater normal target pressure angle than the second gear made of the relatively elastic material. It shall be explained once more that the deviations of the normal target pressure angles are not to be compared to deviations of the normal actual pressure angles, which can form as a result of production deviations or production tolerances. The gears of the gear pairing rather have different normal target pressure angles. Normal target pressure angles specifically deviating from each other are therefore defined for the gears of the gear pairing during production.

Since the gear made of the relatively inelastic material has a bigger normal target pressure angle and thus also a bigger normal actual pressure angle than the gear made of the relatively elastic material, a compression reduction can be reduced in a foot area of the teeth of the gear made of the relative elastic material, whereby the wear susceptibility of the gear made of the relatively elastic material can be reduced. The noise excitation can also be reduced on a gear comprising the gear pairing.

It is thus in the sense of the disclosure that with a gear pairing 10 of two gears 11,12 manufactured from materials of a different elasticity, the gears have different normal target base pitches, preferably different normal target pressure angles and thus also different normal actual base pitches, preferably different normal actual base pitches. The deviation in the normal target base pitches, preferably in the normal target pressure angles, and thus also the resulting deviation in the normal actual base pitches, preferably in the normal actual pressure angles of the gears 11, 12 manufactured from different materials is greater than the differences resulting from production deviations or production tolerances in the normal actual base pitches, preferably in the normal actual pressure angles.

Compared to the gear of the gear pairing manufactured from the relatively elastic material, the gear of the gear pairing manufactured from the relatively inelastic material therefore comprises a smaller normal target base pitch, particularly a greater normal target pressure angle, and thus also a smaller normal target base pitch, particularly a greater normal actual pressure angle.

The normal target modules of the gears 10, 11 of the gear pairing 10 are preferably identical.

The deviation between the normal target base pitches, particularly the angular deviation between the normal target pressure angles, the gears 11, 12 of the gear pairing 10 is dependent on the operating stress of the gear pairing 10 and/or dependent of the operating temperature of the gear pairing 10, and/or is dependent on the material pairing of the gear pairing 10.

This deviation between the normal target base pitch, particularly this angular deviation between the normal target base pitch, the gears 11, 12 of the gear pairing 10 can furthermore also be dependent on the size of the gear that the gear pairing is used in.

In an advantageous further design of the disclosure, provision can be made for that the gears 11, 12 of the gear paring 10 manufactured from materials with a different elasticity additionally differ with regard to their target tip rounding and/or target tip reliefs.

The gear pairing per the disclosure 10 is a gear pairing of a transmission, particularly of an involute cylindrical gear or an involute bevel gear, or an involute planetary gear.

It is important for the disclosure that a gear of the gear pairing consists of a material that is more elastic than a gear that is engaged with the same, whereby the more elastic gear is distinguished by a smaller normal target pressure angle. The normal target modules of the gears are preferably identical.

REFERENCE SIGNS

10 Gear pairing
11 Gear
12 Gear
13 Tooth
14 Tooth

The invention claimed is:

1. Gear pairing of a transmission, with a first gear and with a second gear that is engaged with the first gear wherein the first gear is manufactured from a material that is less elastic or less soft in comparison to the second gear, and that the first gear and the second gear have different normal target base pitches, wherein the first gear has a smaller normal target base pitch than the second gear.

2. Gear pairing according to claim 1, wherein the first gear has a greater normal target pressure angle than the second gear.

3. Gear pairing according to claim 2, wherein a difference in normal target pressure angles between the first gear and the second gear is larger than differences in normal target pressure angles resulting from production deviations or production tolerances.

4. Gear pairing according to claim 2, wherein an angular deviation between the normal target pressure angle of the first gear and the normal target pressure angle of the second gear is dependent on operating stresses of the gear paring.

5. Gear pairing according to claim 2, wherein an angular deviation between the normal target pressure angle of the first gear and the normal target pressure angle of the second gear is dependent on operating temperatures of the gear pairing.

6. Gear pairing according to claim 2, wherein an angular deviation between the normal target pressure angle of the first gear and the normal target pressure angle of the second gear is dependent on the material pairing of the gear pairing.

7. Gear pairing according to claim 1, wherein the first gear and the second gear have the same normal target modules.

8. Gear pairing according to claim 1, wherein the first gear is made of a metal and the second gear is made of a plastic.

9. Gear pairing according to claim 1, wherein a deviation between the normal target base pitch of the first gear and the normal target base pitch of the second gear is dependent on operating stresses of the gear pairing.

10. Gear pairing according to claim 1, wherein the first gear and the second gear furthermore differ in terms of a target tip rounding.

11. Gear pairing according to claim 1, wherein the first gear or the second gear have involute teeth.

12. A cylindrical gear pair with at least one gear pairing according to claim 1.

13. A bevel gear pair, with at least one gear pairing according to claim 1.

14. A planetary gear pair, with at least one gear pairing according to claim 1.

15. Gear pairing according to claim 1, wherein the difference in normal target base pitches between the first gear and the second gear is larger than differences in normal target base pitches resulting from production deviations or production tolerances.

16. Gear pairing according to claim 1, wherein a deviation between the normal target base pitch of the first gear and the normal target base pitch of the second gear is dependent on operating temperatures of the gear pairing.

17. Gear pairing according to claim 1, wherein a deviation between the normal target base pitch of the first gear and the normal target base pitch of the second gear is dependent on the material pairing of the gear pairing.

18. Gear pairing according to claim 1, wherein a deviation between the normal target base pitch of the first gear and the normal target base pitch of the second gear is dependent on the sizes of the first gear and the second gear.

19. Gear pairing according to claim 1, wherein the first gear and the second gear furthermore differ in terms of a target tip relief.

* * * * *